Patented Dec. 4, 1934

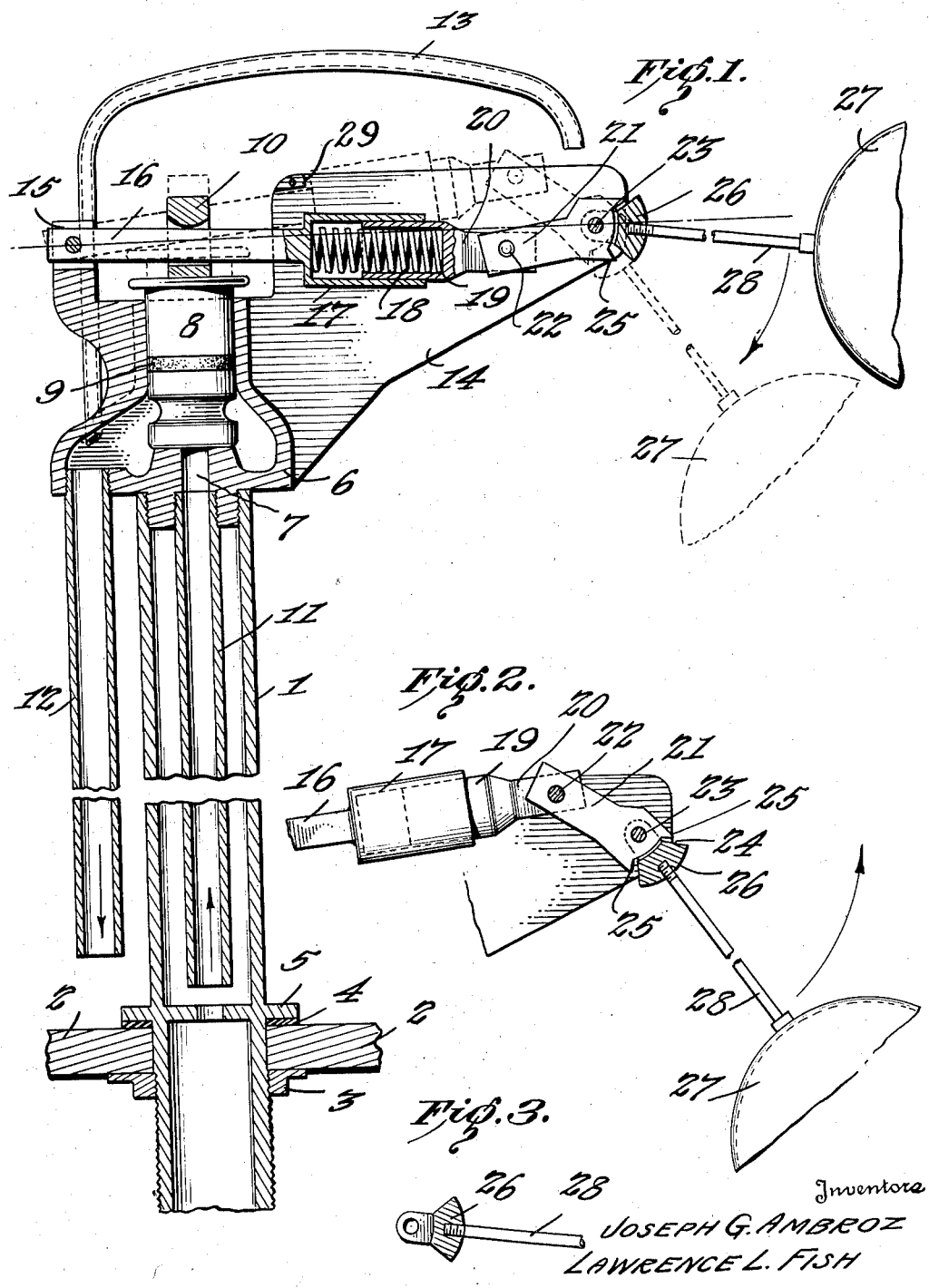

1,983,061

UNITED STATES PATENT OFFICE 1,983,061

QUICK ACTION FLOAT VALVE

Joseph G. Ambroz and Lawrence L. Fish, Chicago, Ill.

Application January 31, 1933, Serial No. 654,510

1 Claim. (Cl. 137—104)

This invention relates to improvements in quick action float valves, and more particularly to a snap action operating device for this type of valve used in the plumbing and heating industry in closet tanks, filling of process vats, and other apparatus.

An object of our invention is to provide an improved snap action actuating mechanism for ball cocks.

Another object of the invention is to provide an improved quick action float valve for flush or closet tanks which will be provided with a snap action valve actuating means for quickly checking the water supply entering the tank after the tank is filled to a fixed level thereby providing more efficient operation of the same.

Other objects will appear as the description proceeds.

In the accompanying drawing which forms a part of our application,

Figure 1 is a side elevation partly in section of our improved snap action float valve and actuating mechanism therefor;

Figure 2 is a side elevation of the telescoping spring valve actuating means and linkage connected therewith, and Figure 3 is a detail view of the pivoted operating segment on which the float ball is mounted.

Like characters of reference are used throughout the following specification and the accompanying drawing to designate corresponding parts.

In carrying out our invention we provide a supporting tube or casing 1 which extends through the bottom of the closet tank 2 and is secured in place by the threaded nut 3 in engagement with the bottom of the tank. A gasket 4 is disposed between the annular flange 5 on the casing 1 and the upper surface of the bottom of the tank 2.

The valve housing 6 is attached to the upper end of the casing 1, and is formed with an inlet passage 7, adapted to be closed by the valve 8 slidably received in the said housing. The valve 8 is provided with the packing ring 9, and on its upper end is formed a bearing yoke 10. An inlet tube 11 is supported on the housing 6 in alinement with the inlet passage 7 and is arranged concentrically with the casing 1, forming an air chamber between the said tube and casing. The outlet pipe or tube 12 is also supported on the valve housing 6 and is in communication therewith. The usual form of trap refill 13 is provided and also communicates with the valve housing 6.

The housing 6 is further provided with the laterally extending arm 14 on one side of the valve 8, and with the bearing ears 15 at the opposite side of said valve. A valve actuating rod 16 is pivotally supported between the bearing ears 15 and extends through the bearing yoke 10 on the upper end of the valve 8, and terminates at its outer end in the cylindrical open-ended housing 17 adapted to receive and house the coil spring 18. A second cylindrical housing 19 of slightly smaller diameter than the housing 17 is slidably received in the open end of the same, and receives an end of the spring 18, thereby completely enclosing the said spring, which is continually under compression. The housing 19 terminates in a short rod 20, which is connected for pivotal movement with the arm 21 by the pivot pin 22. The outer end of the arm 21 is pivotally mounted on bearing pin 23 fixedly supported on the laterally extending arm 14 on the housing 6. The arm 21 is formed at its opposite end with the arcuate bearing surface 24, provided at its opposite ends with the stop ears 25. The segment 26 is also pivoted on the bearing pin 23 and is concentrically arranged with respect to the surface 24 and is movable within the limits of the stop ears 25. The float ball 27 is supported on the rod 28, which in turn is threaded into the segment 26.

The mode of operation of our snap action valve actuating mechanism is as follows:

When the tank 2 is filled with water, the ball float 27 and the connected valve actuating elements are in the position indicated in full lines in Figure 1 of the drawing. It will be noticed that the valve is closed, and that the several elements forming the valve actuating mechanism are nearly in alinement, and are arranged slightly below an imaginary line drawn between the pivot pin between the bearing ears 15 and the fixed bearing pin 23 on the arm 14. When the closet is operated the water starts to pass from the tank 2 and the ball float 27 will drop until the segment 26 engages the lower ear 25, and as the ball float continues to lower in the tank, the segment 26 will force the rod 21 down about its pivot 23 while the opposite end of the rod is raised. As soon as the adjacent ends of the rods 21 and 20 are elevated above the imaginary straight line connecting the bearing pin in the ears 15 and the bearing pin 23, the compressed spring 18 will snap the elements into the position shown in dotted lines in Figure 1, thereby fully opening the valve 8, permitting water to enter through the casing 1 and housing 6, and out through the hush tube 12 to refill the tank. When the tank is refilled the several elements of the valve actuating mechanism will again assume the position shown in full lines in Figure 1 of the drawing. A stop 29 is mounted on the arm 14 to limit the upward movement of the valve actuating rod 16, as it comes in contact with it.

Many minor changes in detail of construction may be resorted to without departure from the spirit of the invention.

Having thus described our invention what we claim as new and desire to secure by Letters Patent of the United States is:—

In combination, a valve and a housing therefor, a valve actuating rod, a ball float, a snap action connection between said rod and ball float comprising a housing on the end of said valve actuating arm, a second housing slidable in said first housing, a spring under compression in said housings, a fixed pivot on said housing, an arm pivoted on said fixed pivot having a pivotal connection with said second housing, an arcuate bearing surface on said pivoted arm having stop ears at its opposite ends, and a segment pivotally mounted on said fixed pivot having a cooperating bearing surface adjacent the bearing surface on said pivoted arm and being rigidly connected with said ball float.

JOSEPH G. AMBROZ.
LAWRENCE L. FISH.